United States Patent [19]

Kuhlenschmidt

[11] Patent Number: 5,700,097
[45] Date of Patent: *Dec. 23, 1997

[54] CHILDREN'S COMPUTER KEYBOARD

[76] Inventor: Richard E. Kuhlenschmidt, 620 Via de la Paz, Pacific Palisades, Calif. 90272

[*] Notice: The term of this patent shall not extend beyond the expiration date of Pat. No. 5,452,966.

[21] Appl. No.: 650,301

[22] Filed: May 20, 1996

Related U.S. Application Data

[63] Continuation-in-part of Ser. No. 500,452, Jul. 10, 1995, abandoned.

[51] Int. Cl.$^6$ .................................................. B41J 5/10
[52] U.S. Cl. .................... 400/487; 400/489; 434/227
[58] Field of Search ............................ 400/472, 485, 400/486, 487, 489; 345/157, 160, 168; 341/21, 22, 24; 434/227, 233

[56] References Cited

U.S. PATENT DOCUMENTS 4,940,346  7/1990  Liljenquist ........................ 400/487
5,314,337  5/1994  Dixon ............................... 434/227
5,458,425  10/1995 Torok ............................... 400/486
5,483,235  1/1996  Hanson et al. ...................... 341/20

FOREIGN PATENT DOCUMENTS 0012779  1/1983  Japan ............................... 400/487
9317873  9/1993  WIPO ............................... 400/486

OTHER PUBLICATIONS

IBM Technical Disclosure Bulletin vol. 28, No. 2 Jul. 1985, "Ergonomic Keyboard Design for Telephony–Oriented Work Station" Radio Shack Catalog, 1993, p. 9.

*Primary Examiner*—Ren Yan

[57] ABSTRACT

An improved children's computer keyboard includes enlarged keys that are color-coded according to function group. The enlarged keys provide wider top surface and area between keys, which provides each key with a larger error-free zone than a conventional computer keyboard, thus making the present invention more tolerant for human error. Characters on the keys of the improved children's computer keyboard are also enlarged for improved visibility. The keys are arranged in a conventional QWERTY layout.

3 Claims, 10 Drawing Sheets

CHILDREN'S COMPUTER KEYBOARD

This application is a CIP of U.S. application Ser. No. 08/500,452, filed on Jul. 10, 1995, now abandoned.

FIELD OF THE INVENTION

The present invention is generally related to a typing device, and more specifically, it is an improved children's computer keyboard apparatus.

BACKGROUND OF THE INVENTION

The computer is no longer simply a tool for adults. Because of the availability of personal computers, along with more affordable pricing and the proliferation of educational and entertainment software, the computer is increasingly relied on as a tool to educate young children. Computers are being used by children of a very young age, with some software designed for children as young as two years old. Most children's first contact with a computer is for educational and entertainment use.

Many young children begin using the computer keyboard while still preliterate and unfamiliar with and unable to interpret the conventional keyboard configuration or the symbolic representations used on the keyboards. The young user will often spend an inordinate amount of learning time locating the keys on the computer keyboard and correcting unintended keystrokes. This may result in frustration and eventually be destructive to the learning process. Thus, the conventional computer keyboard designed for adults is not properly or specifically designed for the young user and may in fact discourage, delay or obstruct the child's interest in using the computer as a learning tool.

Many young children begin using the computer keyboard before they have fully developed hand-to-eye coordination. Physically disabled individuals may have difficulties mobilizing their limbs and fingers and controlling their body movements. Because of the size of the keys on conventional keyboards, the monochromatic color scheme, and the small characters on the conventional keyboard keys, the above mentioned groups may have great difficulties in making their intended keystroke on a conventional computer keyboard.

Many computer keyboard manufacturers have realized the frustration that young children face with the conventional computer keyboard, and have attempted to overcome the problem. Several types of computer keyboards for children are now available on the market. Each of them has some advantages and disadvantages. Some of them are targeted toward children users only and are not suitable for general purpose use; some rely on device specific software, making them impractical for everyday use; and others may have a more attractive appearance to children users but do not have features to help those children in learning to use a computer.

Vtech Industries and Comfy Interactive Movies Ltd. have both developed a computer keyboard for use by young children. Both keyboards can only be used for software designed specifically for their particular keyboard, making them useless for general application software.

Kidboard Inc's KidBoard, the StarTrek, Flintstones and Nickelodeon keyboards by Brainwork's and the ColorKey keyboard by Keytronics, Inc, are all keyboards marketed for use by children. These keyboards are simply more colorful versions of the conventional adult keyboard with frames decorated apparently to appeal to children. The coloration is merely cosmetic or decorative and serves no educational purpose or function. Operation of these decorative devices is identical to that of a conventional adult keyboard.

U.S. Pat. No. D 358,383 to Wagstrom, has oversized, colorful keys arranged in alphabetical order. The color arrangement in KidKeys is that vowel keys are yellow, R keys is Red, Y key is Yellow, B key is Blue, and the G key is Green. The rest of the keys are gray. The KidKey's arrangement of keys in alphabetical order can only serve as an impediment to learning the QWERTY arrangement when the young user inevitably moves to an adult keyboard.

There have been several attempts to code keys by sight or touch. For example, U.S. Pat. No. 4,940,346 to Liljenquist. This attempt is specifically intended to distinguish individual keys and is for use by a typist schooled in touch typing. It bears no relation to the present invention which is an aid for learning to locate, conceptualize and distinguish between input function groups by the young preliterate user. In another attempt to code keys by sight or touch, U.S. Pat. No. 4,974,183 to Miller, the keys are distinguished by varying their heights and surface profiles, but again this distinguishing capability is limited to the user who is a trained or schooled typist, not a young preliterate child. Furthermore, U.S. Pat. No. 4,555,193 to Stone uses color-coding to allow for the possibility of one-handed typing with a computer keyboard. As in the other above examples, this is geared to the schooled typist.

Large key size has been used in several devices made to make input easier for "older adults and young children". These devices, commonly found in Radio Shack stores, though normally of a telephone type device and not of a keyboard input type device, do not provide the error-free zone that is inherent in the present invention.

SUMMARY OF THE INVENTION

The present invention is a children's computer keyboard with larger keys than those of a conventional keyboard, designed for use by young children or physically disabled or visually impaired users. With the enlarged keys on the keyboard, children will have a higher rate of success in making the intended keystroke, thus inducing their desire to learn through playing with computers. The enlarged keys produce more proficient, skillful and dexterous keystroking by young children, thereby reducing unintended keystrokes, minimizing error and the frustration it causes in the early learner and enhancing the learning process.

The larger keys on the present invention provide a larger top surface on which characters may be applied. It is easier for young children to locate and recognize keys with larger characters on them. Therefore, it is one aspect of the invention to provide not only larger keys but also larger characters on the keys.

The keys are color-coded according to their input function group. Whereas the input function group refers to the alphabetical key group, the numerical key group, the punctuation and text-editing key group, the programmable function group and the cursor control key group. The color-coding according to input function group is instrumental in helping and teaching children locate, conceptualize and distinguish between these groups.

The keyboard of the present invention has the identical layout to that of a conventional QWERTY keyboard. With larger keys and larger characters on those keys, children can identify the location of each key much easier and much faster. With input function groups color-coded the child will locate, distinguish and understand the conceptual differences between these input function groups. The understanding of these concepts is an extremely important early-learning fundamental, as well as a reinforcement for positive self-esteem, also an important early learning requisite. After using the keyboard of the present invention for some time, children will become familiar with the relative position of the keys, because of the above cited features. As a result of the use of the QWERTY keyboard layout, children will already be familiar with the relative positions of the keys and will experience an easy adaptation when transitioning to the conventional adult keyboard.

BRIEF DESCRIPTION OF THE DRAWINGS

The invention is disclosed in the specification and the attached drawings wherein.

DETAILED DESCRIPTION OF THE INVENTION

The conventional computer keyboard cannot fulfill the needs of young children, nor is it designed for use by young children. None of the children's computer keyboards currently on the market are suitable for general public use while at the same time providing educational benefits. What is needed is a computer keyboard which has larger keys relative to the key size of a conventional keyboard that make it easier for young children to make the intended keystroke; color-coded keys to help children locate, conceptualize and distinguish between the different input function groups of keys; bigger characters on the keys that make it easier for children to locate and identify the keys; which is a versatile device for the consumer since it can be used with the wide array of conventional, off-the-shelf educational and entertainment software. When using a keyboard with the above features, young children can enjoy learning more and will have more time to learn, rather than spending time locating keys and correcting unintended keystrokes.

Figure 1:
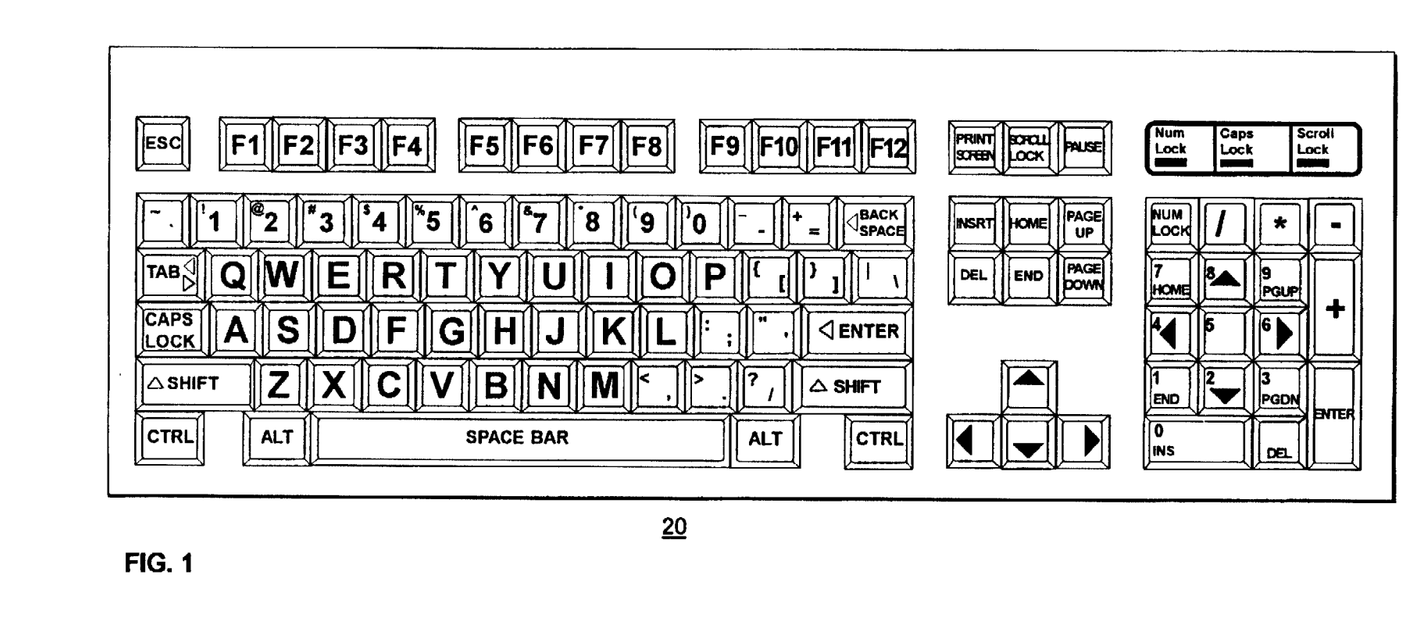
FIG. 1 is the improved children's computer keyboard face.
Figure 2:
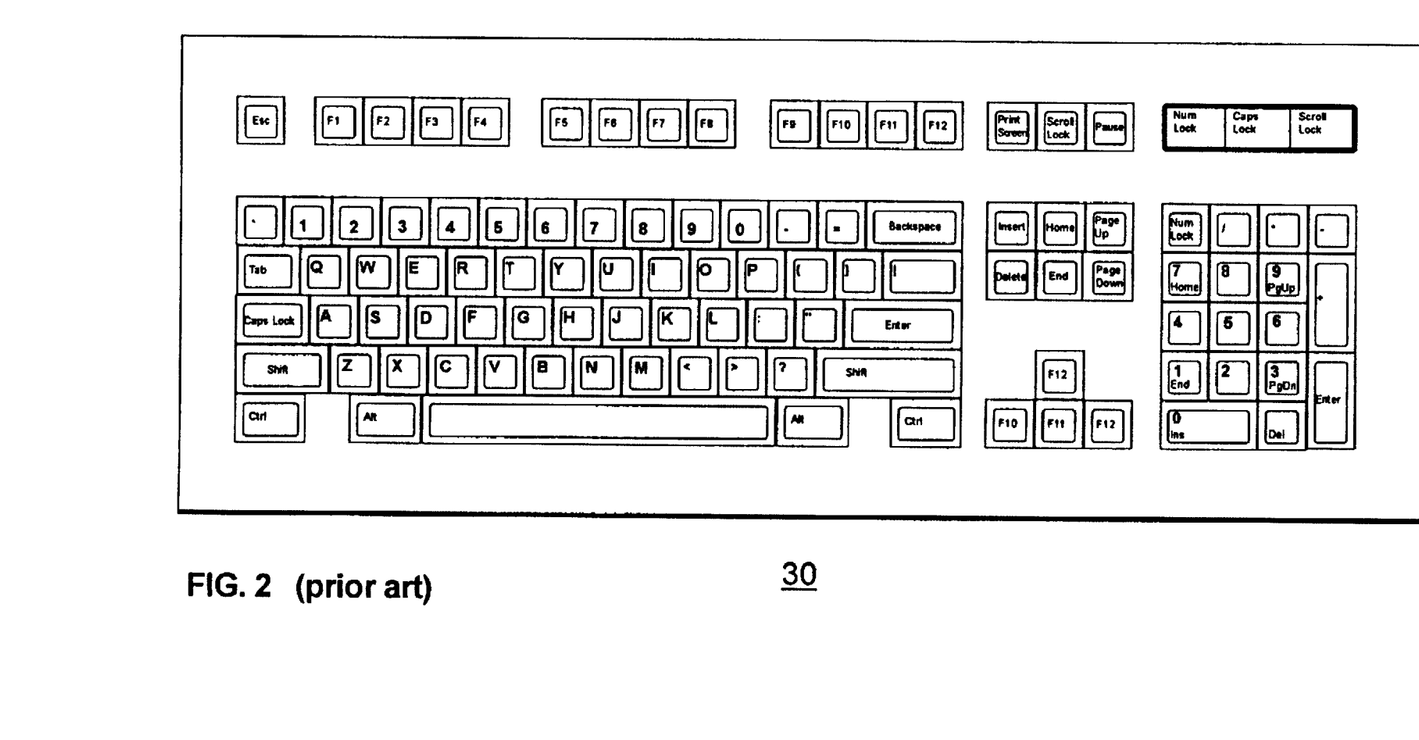
FIG. 2 is the conventional computer keyboard face.

FIG. 2 is a drawing of prior art keys of a conventional computer keyboard 30. FIG. 1 is a drawing of the improved children's computer keyboard 20 face of the present invention. The improved children's computer keyboard has enlarged keys relative to the conventional computer keyboard.

Figure 3A:
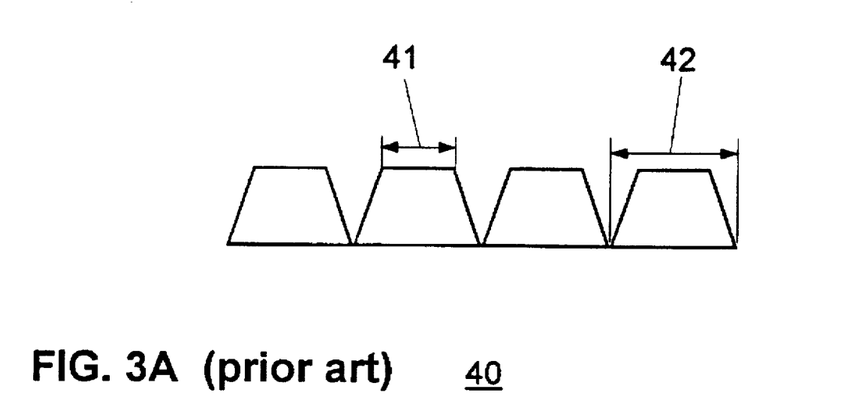
FIG. 3A is a fragmentary longitudinal cross-sectional view of the keys of a conventional computer keyboard.
Figure 3B:
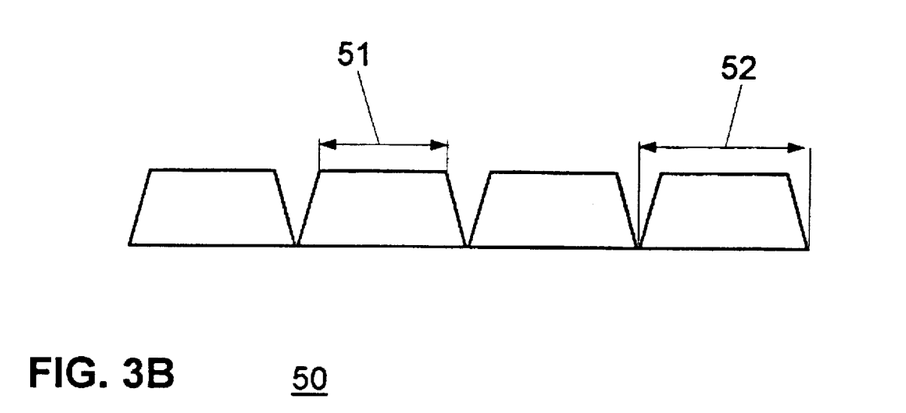
FIG. 3B is a fragmentary longitudinal cross-sectional view of the keys of the improved children's computer keyboard according to the invention.

FIG. 3A is a drawing of prior art keys of a conventional computer keyboard 30. FIG. 3B is a drawing to the same relative scale of the keys of the improved children's keyboard 20. As shown in the drawings, the keys of the children's computer keyboard 20 has an enlarged base dimension 52 and top surface dimension 51 relative to the base dimension 42 and top surface dimension 41 of the keys on the conventional computer keyboard 30.

Figure 4A:
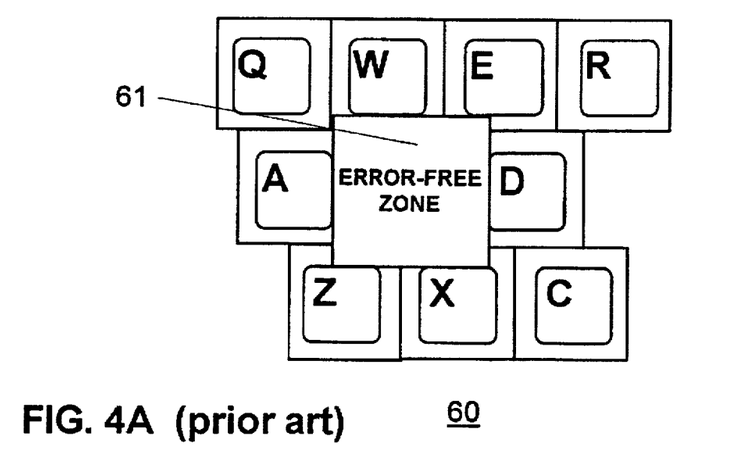
FIG. 4A is a top plan view of the keys of a conventional computer keyboard showing error-free zone.
Figure 4B:
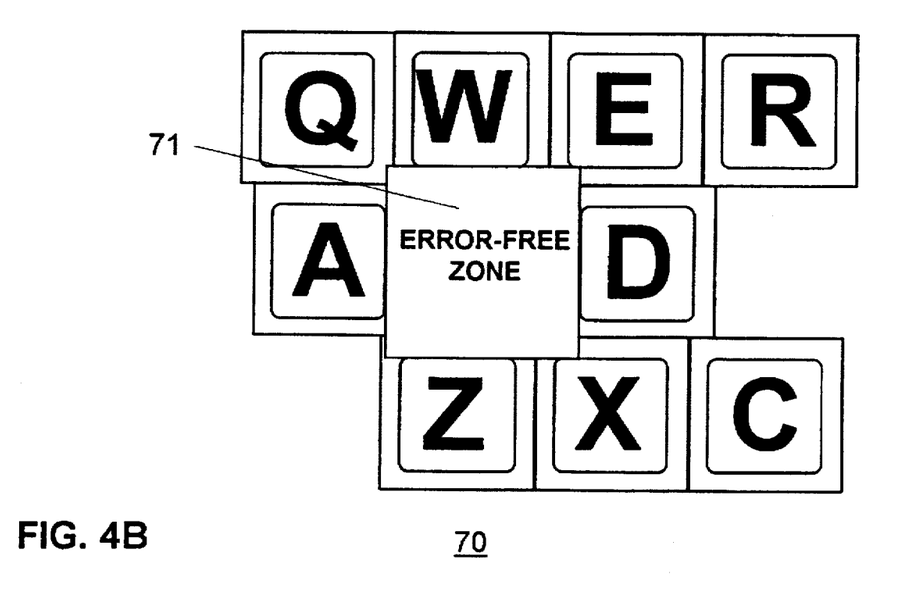
FIG. 4B is a top plan view of the keys of the improved children's computer keyboard in accordance with the present invention showing error-free zone.

FIG. 4A is a drawing of the top plan view of prior art keys of a conventional computer keyboard 30 showing an error-free zone, which is to be defined later. FIG. 4B is a drawing to the same relative scale of the top plan view of keys of the improved children's computer keyboard 20 also showing an error-free zone. The example shown on these two figures shows keys on the improved children's computer keyboard 20 have a bigger error-free zone 71 than the error-free zone 61 of the keys on a conventional sized computer keyboard 30.

Figure 5A:
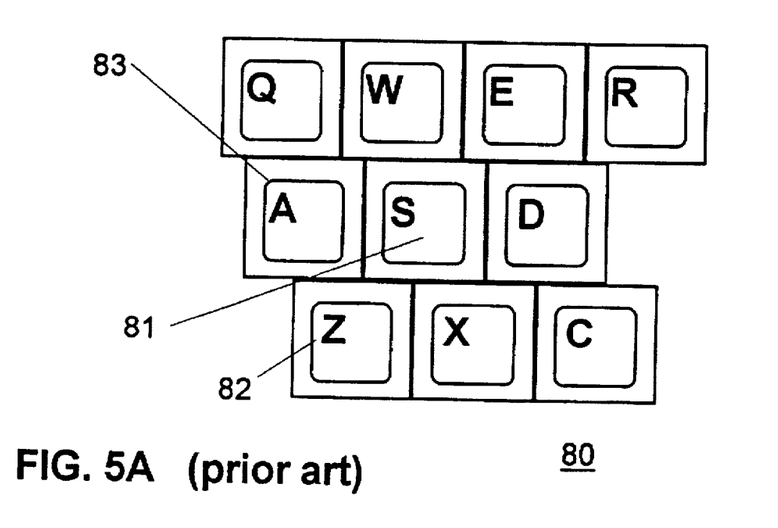
FIG. 5A is a top plan view of the keys of a conventional computer keyboard.
Figure 5B:
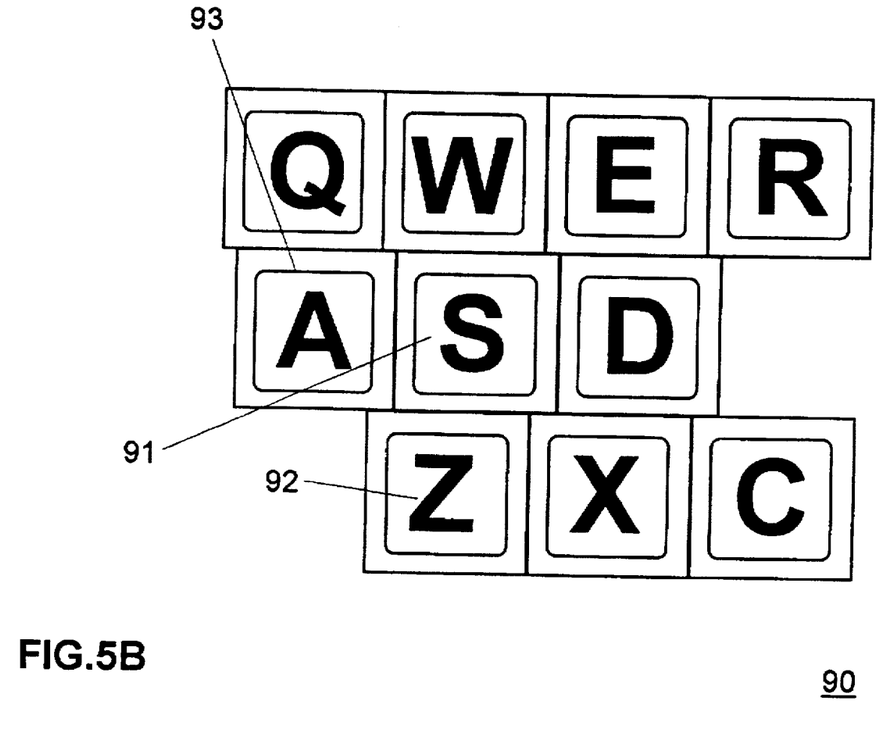
FIG. 5B is a top plan view of the keys of the improved children's computer keyboard according to the invention.
Figure 6:
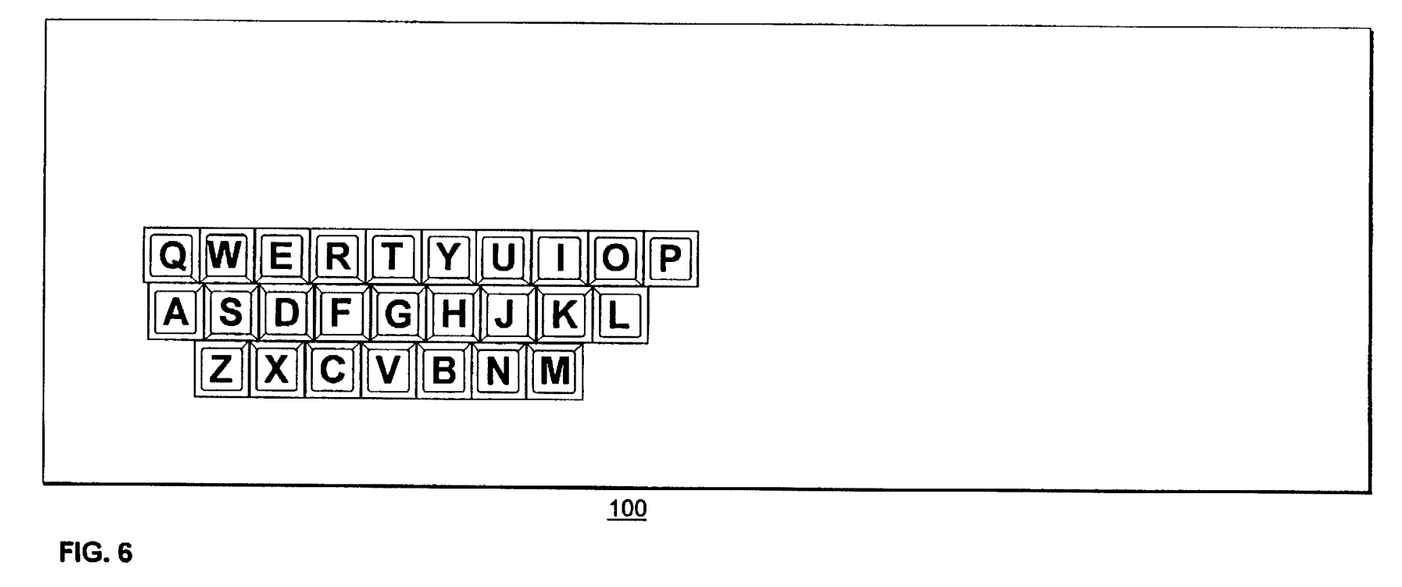
FIG. 6 is a top plan view of the keys comprising the alphabetical key group.
Figure 7:
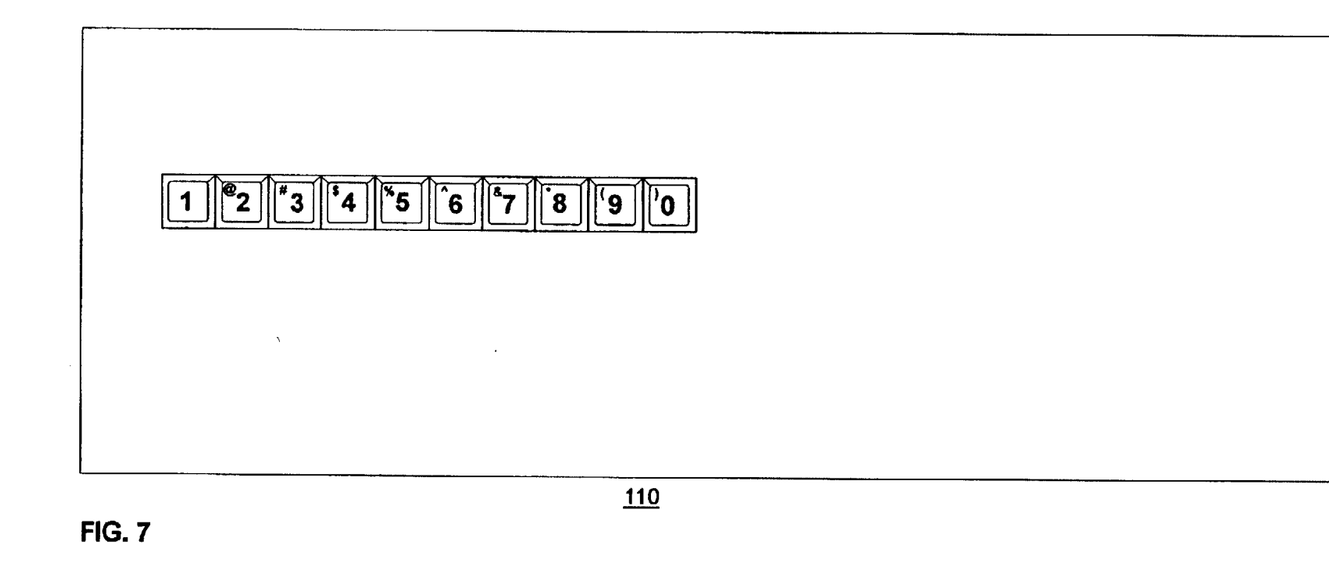
FIG. 7 is a top plan view of the keys comprising the numerical key group.
Figure 8:
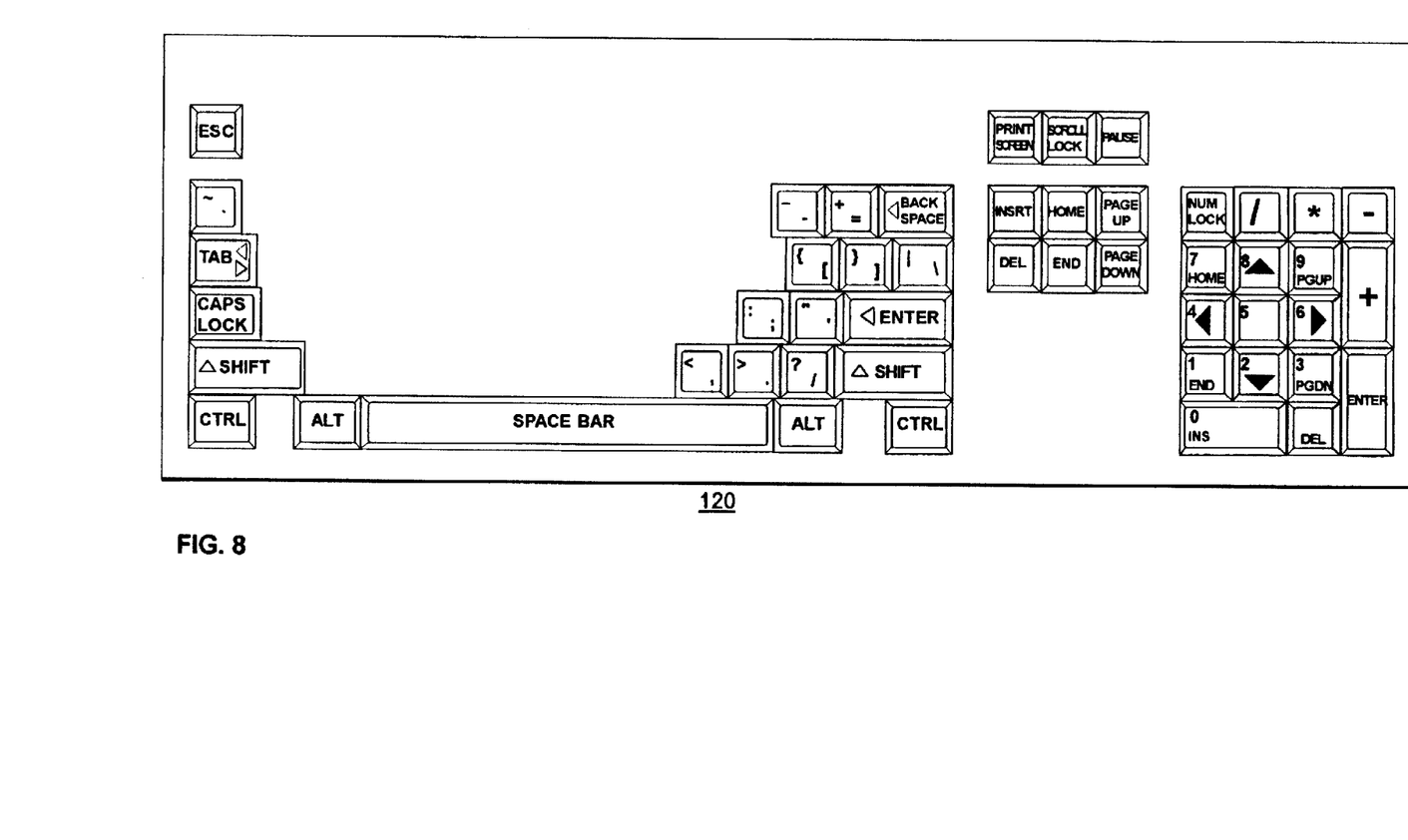
FIG. 8 is a top plan view of the keys comprising the text-editing key group.
Figure 9:
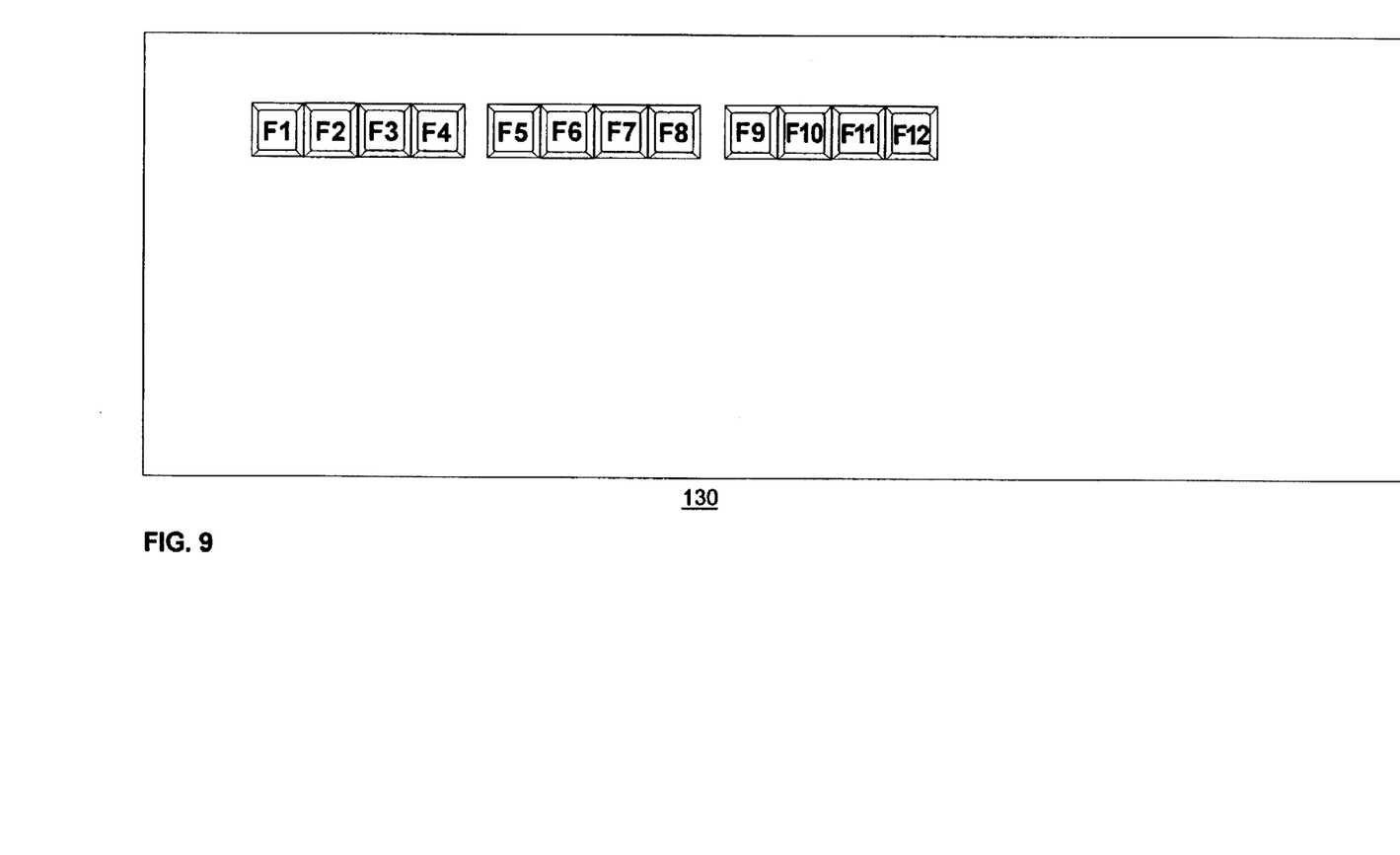
FIG. 9 is a top plan view of the keys comprising the programmable function key group.
Figure 10:
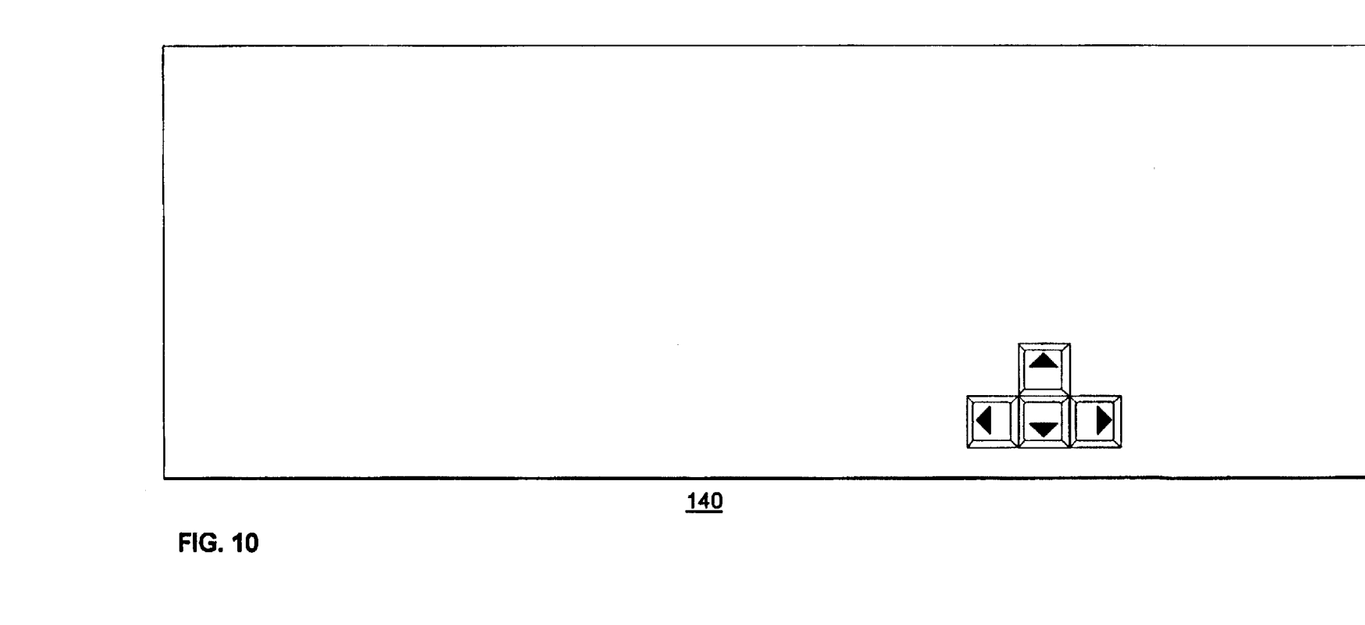
FIG. 10 is a top plan view of the keys comprising the cursor-control key group.

FIG. 5A is a drawing of the top plan view of prior art keys on a conventional computer keyboard 30 showing the top surface of target area 81 of the keys and characters 82 on the keys. FIG. 5B is a drawing to the same relative scale of the top plan view of keys of the improved children's computer keyboard 20, also showing target area 91 of the keys and characters 92 on the keys. The example shown on these two drawings shows the character 92 on the improved children's computer keyboard 20 are much larger than the characters 82 on the conventional computer keyboard 30.

SIZE OF KEYS

The improved children's computer keyboard 20 described in this invention has square or rectangular keys which have a proportionately larger top surface dimension 51 and base dimension 52 relative to the top surface dimension 41 and base dimension 42 of conventional keyboards 30. The top surface 51 of the keys being approximately ¾" from end to end along a line parallel to at least one top surface edge. The base dimension 52 of the keys being approximately 1" from end to end along a line parallel to at least one base dimension edge. FIG. 2 shows a conventional keyboard 30. When young children are using this conventional keyboard 30 they are less likely to make the intended keystroke. This is because the keys on the conventional keyboard 30 are made for efficient typing by adult users, not for the random exploration and risk-taking that is involved in the learning process of the preliterate child. Larger keys, however, by virtue of their size, are easier for the young user to identify and distinguish. Therefore, the keys on the conventional keyboard 30 are smaller and less tolerant for errors. Had children users used the improved children's computer keyboard 20 described in the present invention, they would have had a higher rate of success in making the intended keystroke.

ERROR-FREE ZONE

The enlarged keys of the improved children's computer keyboard 20 described in this invention are more tolerant to potential mistakes made by the user as they have a bigger error-free zone. The more tolerant the keys are to mistakes, the less mistakes the user will make, the less time the user will spend on correcting the mistakes, the less frustrated the user will be. Therefore, he or she can spend more time in learning and playing on a computer and will be more motivated to do so.

A typical square shaped key of the improved children's computer keyboard 20 would have a larger 71 error-free zone than the error-free zone 61 of a conventional computer keyboard 30. The error-free zone is the distance between the two closer edges of the top surfaces of two opposite sided neighboring keys to that key. Specifically, it is the horizontal distance between two neighboring keys, that is the right top surface edge of the key to the left of that key and the left top surface edge of the key to the right of that key, and the vertical distance between two neighboring keys, that is the lower top surface edge of the key above that key and the upper top surface edge of the key below that key.

There have been other attempts at enlarging key size, as in the above cited Radio Shack Catalog reference, to provide enlarged buttons in order to enable use by "small children or older adults." In contrast, the enlarged keys on the improved children's computer keyboard are shaped like a truncated pyramid, smaller at the top or target area, wider at the base. Small children, older adults and disabled users will have not only an enlarged surface or target for which to aim, as in the case of the above cited enlarged buttons, but there is also an inherent error-free zone which allows the small child, older adult, or disabled user whose aim may not be particularly accurate, to make the correct and intended keystroke even if the key is not directly hit. The target area of the key is surrounded by a large error-free zone which allows for contact with the intended key to be partial, imprecise and inaccurate, while at the same time allowing for the key to be hit, causing the intended function, before the top surface of the adjacent or incorrect key will be stroked.

COLOR-CODED INPUT FUNCTION GROUPS

By color-coding the input function groups the preliterate child user can easily locate, conceptualize and discriminate between the different input function groups. The color-coding also helps the preliterate child conceptualize the difference between the symbolic representation of letters, numbers, punctuation and text-editing keys, cursor control keys and programmable function keys.

Although there have been previous attempts to help the user discriminate between keys, before as in the above cited examples, these attempts have been developed in order to help the experienced and schooled user discriminate either between individual keys, as in the above cited U.S. Pat. No. 4,940,346 to Liljenquist, or to allow for the experienced and schooled typist to find their home position, as in the above cited U.S. Pat. No. 4,974,183 to Miller, allowing for editing changes to be made without looking, or to allow for the possibility of typing with one hand as in U.S. Pat. No. 4,555,193 to Stone.

The above cited Liljenquist patent uses visual pattern on each key in order to facilitate visual discrimination between keys, and different surface textures on each row to help in key discrimination and manual orientation. In contrast, the color-coding in the applicant's keyboard allows for the pre-literate and unschooled user to locate, differentiate and conceptualize input categories, which include the alphabetic key group 100, the numeric key group 110, the text-editing key group 120, the programmable function key group 130, and the cursor control key group 140 cursor movement.

QWERTY KEYBOARD LAYOUT

The improved children's computer keyboard described in this invention utilizes the traditional QWERTY keyboard layout. FIG. 1 shows the face of the improved children's computer keyboard 20. When young children use this keyboard, they will have the opportunity to learn the relative position of the keys on a conventional keyboard with the QWERTY layout. By the time they are old enough to learn to type, they will already be familiar with the relative location of each key on a keyboard with QWERTY layout. It is because of the utilization of the QWERTY layout that, despite the present invention's "kid friendly" appearance, the improved children's computer keyboard is designed for widespread general use with conventional, off-the-shelf educational and entertainment software as well as being usable for normal typing in adult application software.

The above cited Wagstrom patent also utilizes oversized keys. However, the keys in this patent are arranged in an alphabetical order, not in the conventional QWERTY keyboard layout. The alphabetical keyboard layout will necessitate the child user to relearn the QWERTY layout when graduating to a conventional adult keyboard. The alphabetical arrangement also makes use awkward or unusable for conventional off-the-shelf educational and entertainment software and by adults for adult application software.

LARGER CHARACTERS ON KEYS

The keys of a conventional sized keyboard 30 has smaller conventional characters 82 positioned on the upper left corner top surface of the key, while the characters 92 of the present invention 20 are bigger than the conventional characters 82. Because the top surface area 93 is larger relative to the top surface area 83 of the conventional sized computer keyboard, there is more space to afford its equipment with a larger character.

The invention has been described with reference to be used in a computer system, but it will be appreciated that it may be applied to many other applications where it may be advantageous to be used.

What I claim is:

1. An improved children's computer keyboard comprising:
   a numerical key group, an alphabetical key group, a programmable function key group, a punctuation and text-editing key group, and a cursor control key group, each of said groups of keys being a different color;
   each of said key groups consisting of square or rectangular keys with enlarged top surface and base dimension relative to those of conventional keyboards wherein
   a.) said top surface of rich said key being ¾" from end to end along a line that is parallel to at least one top surface edge; and
   b.) said base dimension of each said key being 1" from end to end along a line that is parallel to at least one base dimension edge.

2. The computer keyboard of claim 1, wherein the alphabetic key group is arranged in a QWERTY layout.

3. The computer keyboard in claim 1, further comprising enlarged characters on the keys.

\* \* \* \* \*